Jan. 3, 1961
G. J. MULLANEY ET AL
2,966,793
SHOCK TUBE FOR THE STUDY OF COMBUSTION PROCESSES
Filed Jan. 28, 1957
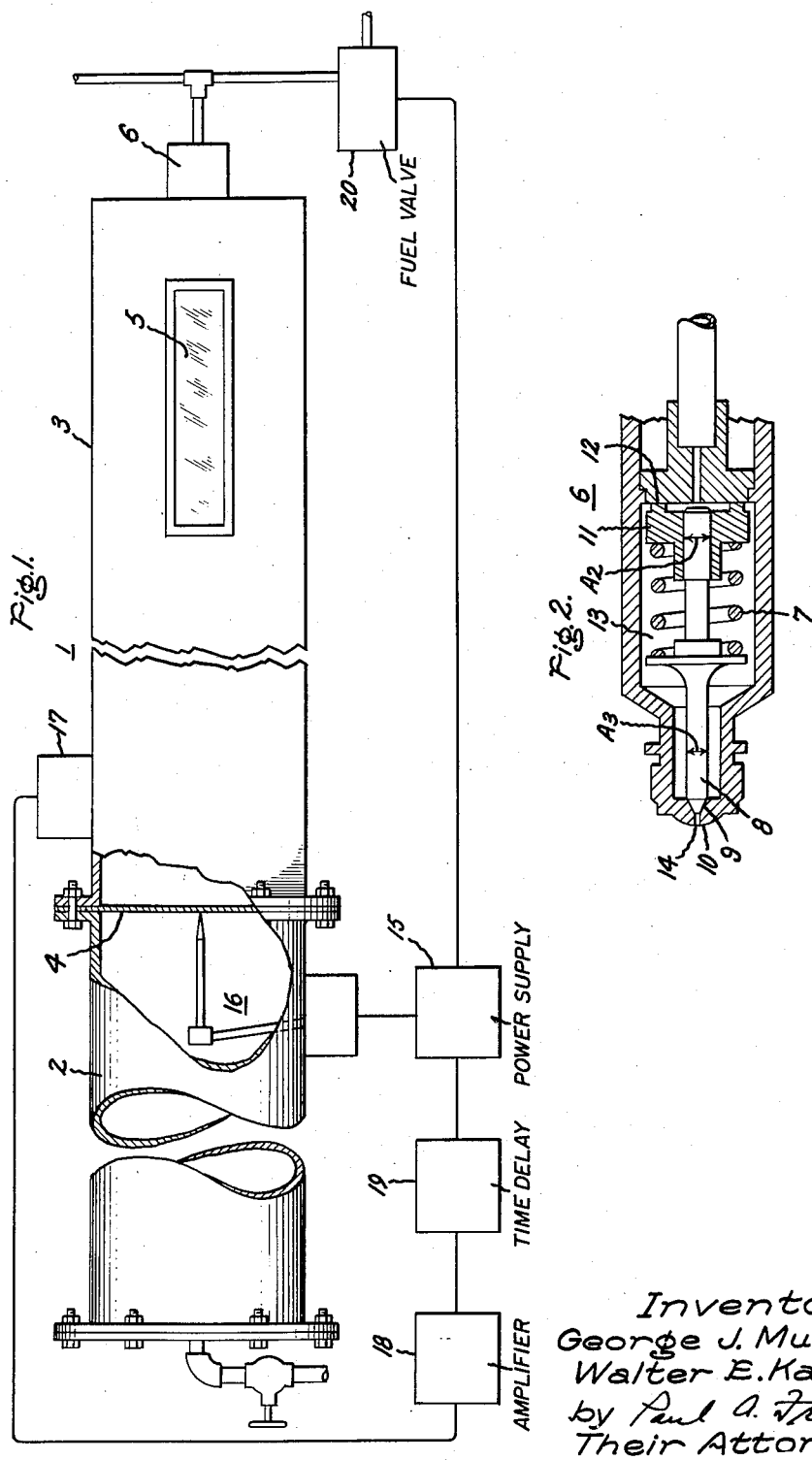
Inventors:
George J. Mullaney,
Walter E. Kaskan,
by Paul A. Frank
Their Attorney.

United States Patent Office 2,966,793
Patented Jan. 3, 1961

2,966,793

SHOCK TUBE FOR THE STUDY OF COMBUSTION PROCESSES

George J. Mullaney, Ballston Lake, and Walter E. Kaskan, Schenectady, N.Y., assignors to General Electric Company, a corporation of New York Filed Jan. 28, 1957, Ser. No. 636,829

5 Claims. (Cl. 73—35)

This invention relates to shock tubes and, more particularly, to the combination of a shock tube with fuel injecting means.

The shock tube which has come into widespread use as means for gas dynamic research comprises, in general, a straight tube closed at both ends, and containing a gas of high pressure separated by a diaphragm from a gas of low pressure. When the diaphragm is ruptured, the high pressure gas expands into the low pressure section generating a shock wave, described as the incident shock wave, that propagates into the lower pressure gas, heating and compressing it. The gas is further heated and compressed when the shock wave reflects from the end of the tube and in some instances where fuel is present, ignites the fuel. Heretofore, autoignition of liquid fuels has been studied with many kinds of apparatus, including bomb type devices, rapid compression machines using a metal piston, or actual engine piston and cylinders. The shock tube technique is a relatively new approach to the study of autoignition of liquid fuel sprays. The results of such studies may be applied to improve autoignition engines of which the conventional and free piston diesel are typical examples, and also spark ignition engines.

In the previous use of shock tubes for the study of autoignition, gaseous fuel air mixtures were placed in the low pressure section of the tube and either the incident or reflected shock wave, which may be described as the reflected incident shock wave, employed to provide the desired pressures and temperatures. This method has certain disadvantages in the necessary instrumentation, since measurement times are in the microsecond range. Furthermore, retaining the premixed gases in a small volume generally entails an additional diaphragm. In the shock tube of this invention, not only are the above disadvantages overcome, but air can be provided at a known high temperature and pressure without the complications of design of a static bomb for high temperatures. Additionally, high pressures and temperatures are obtainable over a wide range and both can be rapidly adjusted from one experiment to the next.

It is an object of this invention to provide a shock tube wherein a shock wave is generated which, after reflection from the tube end, is used for the instigation of ignition of gaseous, liquid, and solid fuels.

It is another object of this invention to provide fuel injection means for shock tubes.

It is still another object of this invention to provide for a liquid spray of fuel into a shock tube.

It is still another object of this invention to provide, in a shock tube, a stationary gas at a known pressure and temperature into which fuel can be injected.

Briefly stated, in accordance with one aspect of this invention, combustion conditions in internal combustion engines are duplicated for the study of combustion, in the form of a shock tube having driving and driven gas sections separated by a diaphragm. Upon rupture of the diaphragm, a shock wave is created which travels into the low pressure section and reflects from one end wall of the tube. Thereafter, fuel is injected into the gas behind the shock wave to be ignited by the high pressure and high temperature conditions for the study of combustion processes.

While the specification concludes with claims particularly pointing out and distinctly claiming the subject matter of the invention, it is believed that this invention will be better understood from the following description taken in connection with the accompanying drawing.

Fig. 1 discloses one diagrammatic form of this invention; and

Fig. 2 discloses the fuel nozzle as utilized in the modification of Fig. 1.

Referring now to Fig. 1, there is shown a conventional shock tube 1 having a pair of chambers or sections 2 and 3. Chamber 2 is shown as a steel cylinder extending to a length of approximately 6 meters. Chamber 3 is shown as a square metal tube of approximately 10 meters in length, the square configuration being utilized to facilitate optical measurements such as direct photography, schlieren, and spectrographic studies, etc. The length of the shock tube is not particularly critical; however, it must be long enough so that the zone of stable gas is at a known pressure and temperature after the shock wave reflection, in order to study the evaporation of liquid fuels, the mixing of the fuel and oxidizer, the ignition delay period, and the rapid reaction which follows. The length as herein stated has given desirable results in the study of diesel combustion processes which are of approximately 15 milliseconds duration.

A diaphragm 4 is mounted between chambers 2 and 3 in order to maintain separation of the gases at different pressures, and to provide an instantaneous method of releasing the high pressure gas. While various devices may be utilized in lieu of a diaphragm, it has been found that a cellulose acetate diaphragm provides desirable release characteristics when ruptured by a solenoid operated puncturing device 16.

In order to provide optical measurements and photographic inspection of the combustion processes, a window 5 is included in the combustion section of chamber 3. Other measurements including pressures and temperatures in the combustion zone may be conveniently obtained with the shock tube of this invention.

A fuel nozzle 6 is also mounted in the end wall of chamber 3 and is arranged to inject fuel axially into the tube. Nozzle 6 is of the accumulator type which is well known in the prior art and for a description of the same, reference is now made to Fig. 2.

Referring now to Fig. 2, a biasing spring 7 holds a needle valve piston 8 on its seat 9 at the nozzle tip 10, and also the cuff 11 on its seat 12. When fuel under pressure is introduced into the nozzle, the cuff 11 is lifted from its seat 12 and fuel flows into the nozzle body 13 and, in accordance with its compressibility, the pressure of the fuel within the nozzle 13 is increased. When fuel delivery into the nozzle is interrupted by opening of the valve 20 of Fig. 1, the cuff 11 returns to its seat 12 retaining a high pressure within the nozzle. The fuel pressure in the nozzle acts upon a differential area of $A_2$—$A_3$, and this force is greater than the force of the biasing spring 7 in maintaining the needle 8 on its seat 9, so that the needle 8 is thereby displaced, thus opening the spray orifice 14 for the injection of fuel into the shock tube. Fuel flow from the nozzle continues until the fuel pressure within the nozzle body 13 is less than that required to overcome the spring force, at which time the needle 8 closes and the cycle is then completed. It is to be noted that the employment of this particular type fuel nozzle as described, in a shock tube application, is advantageous in that it can be easily adapted for use in the system for timing the fuel injection. However, more conventional fuel nozzles may also be used to inject fuel in the desired form, such as liquid, solid, gaseous, or combinations thereof.

Referring again to Fig. 1, in the general operation of the shock tube, chamber 2 is filled with a gas such as helium, air and the like, under a predetermined pressure. Chamber 3 contains generally a different gas from that in chamber 2 and under considerably less pressure. For the diesel combustion process as before mentioned, the gas in chamber 3 is air or other gas mixture capable of supporting combustion. Thereafter, an electrical circuit is closed between a suitable power supply diagrammatically shown as 15 and a solenoid plunger 16 which ruptures the diaphragm. The rupturing of the diaphragm creates an incident shock wave which progresses into chamber 3. In moving through chamber 3, the shock wave passes over a transducer 17 which produces an electrical signal from mechanical deflection imposed by the shock wave. This electrical signal is then amplified by amplifier 18, introduced into a time delay apparatus 19 and after a predetermined delay operates valve 20. The predetermined delay is understood to be dependent on the system and the type of combustion process under consideration. The velocity of the shock wave is calculated from the known pressures in chambers 2 and 3 so that the time delay period includes the time necessary for the travel of the shock wave to the end of the tube for reflection and the time for fuel injection. The operation of valve 20 serves to reduce fuel pressure in the line to the nozzle 6, thus, as heretofore described, operating the nozzle for the injection of fuel for the spontaneous combustion or auto-ignition thereof. Prior to the injection of fuel and depending on the time delay, the shock wave will have progressed through chamber 3 to be reflected from the end wall thereof and fuel is then injected behind the reflected shock wave. One of the important aspects at this point is that the gas into which the fuel is injected after the shock wave has passed is stationary and at a known temperature and pressure, and by the use of a sufficiently long shock tube, this gas at a high temperature and pressure is retained for a known length of time which is necessary for the experimental conditions required. It can be appreciated that prior shock tubes containing a premixed portion of fuel and air are inapplicable to the study of injection processes, evaporation, mixing, and all variables influenced not only by the introduction of fuel but also by conditions existing immediately after introduction and leading to combustion. It is an additional feature of this invention that the complete operation, from pre-introduction of fuel to after combustions, takes place in continuous sequence in one tube.

Among the various usages of this shock tube are to be included the study of (1) time for evaporation of liquid fuel sprays, (2) ignition delay characteristics of various liquid fuels as a function of air temperature at constant air pressure, (3) various fuels relative to rapid pressure changes with time after the ignition delay is over, (4) the intermediate reactions in the ignition delay process for various fuels by spectrographic techniques in order to understand more clearly what causes the large differences in ignition delay or the effect of wall surfaces and their temperatures on the ignition delay process at constant air pressure and temperature, and (5) investigations of the effect of fuel quantities and rate of fuel delivery on ignition delay.

While the present invention has been described with reference to a particular embodiment thereof, it will be understood that numerous modifications may be made by those skilled in the art without departing from the scope of this invention. Therefore, we aim in the appended claims to cover all such equivalent variations as come within the true spirit and scope of the foregoing disclosure.

What we claim as new and desire to secure by Letters Patent of the United States is:

1. A shock tube for the autoignition of fuel comprising a closed tube, a combustion supporting gas in said tube, means for generating a shock wave in said tube moving towards one end thereof, means timing the velocity of said shock wave in said tube, said shock wave raising the pressure and temperature of said combustion supporting gas to a predetermined value, means for injecting fuel into one end of said tube after said shock wave has reflected therefrom, said fuel characterized by being spontaneously ignitible at said predetermined pressure and temperature, and means measuring conditions within said tube.

2. In a shock tube for the study of combustion processes, the combination comprising, first and second adjacent chambers, a gas under a predetermined pressure in the first of said chambers, a combustion supporting gas in the second of said chambers at a lower pressure than the gas in the said first chamber, means for separately maintaining the gases in their respective chambers, means for releasing the high pressure gas from the first chamber into the gas in the second chamber to generate a shock wave in said second chamber, means timing the velocity of said shock wave, said shock wave moving through said second chamber raising the pressure and temperature of the combustion supporting gas to a predetermined value and to be reflected from the end wall thereof, and means for introducing fuel into said second chamber behind said reflected shock wave, said fuel being characterized as spontaneously ignitible at the pressures and temperatures generated by said reflected shock wave, and means measuring conditions within said tube.

3. In a shock tube for the study of combustion processes, the combination comprising, a pair of tubes each having one end closed, said tubes positioned with their open ends in abutting relationship, a diaphragm between said open ends arranged to seal said tubes, a gas under predetermined pressure in one of said tubes, a combustion supporting gas in the other of said tubes at a lower pressure than the gas in the first of said tubes, means for rupturing the said diaphragm to release the high pressure gas in the first of said tubes into the gas in the other of said tubes to generate a shock wave in the other of said tubes, said shock wave moving through said other tube to raise the pressure and temperature of said combustion supporting gas to a predetermined value and to be reflected from the end wall thereof, means for timing the velocity of said shock wave, and means for injecting a liquid fuel into said other tube behind said reflected shock wave, said fuel being characterized by being spontaneously ignitible at the pressure and temperature generated by said shock wave, and means operatively connected to said tube for measuring the combustion process.

4. The invention as claimed in claim 2 wherein said means for injecting liquid fuel comprises an accumulator type nozzle.

5. In a shock tube for the study of combustion processes, the combination comprising, a pair of tubes each having one end closed, said tubes positioned with their open ends in abutting relationship, a diaphragm between said open ends arranged to seal said tubes, a gas under predetermined pressure in one of said tubes, a combustion supporting gas in the other of said tubes at a lower pressure than the gas in the one tube, means for rupturing the said diaphragm to release the higher pressure gas in the one tube into the gas in the other of said tubes to generate a shock wave in the other of said tubes, said shock wave moving through said other tube raising the pressure and temperature of the combustion supporting gas therein to a predetermined value and reflection from the end wall thereof, and an accumulator nozzle in the end wall of the other of said tubes to inject a stream of liquid fuel behind said shock wave, said fuel being spontaneously ignitible at the pressures and temperatures generated by the said shock wave, optical inspection means in the other of said tubes, and time delay means to initiate the fuel injection at a predetermined time after the shock wave has reflected from the end wall of said tube.

References Cited in the file of this patent

UNITED STATES PATENTS

| | | |
|---|---|---|
| 2,500,964 | Sullivan et al. | Mar. 21, 1950 |
| 2,537,096 | Shreeve et al. | Jan. 9, 1951 |
| 2,824,444 | Hanes | Feb. 25, 1958 |

FOREIGN PATENTS

| | | |
|---|---|---|
| 640,495 | Great Britain | July 19, 1950 |

OTHER REFERENCES

"New Data in Automotive Combustion," National Bureau of Standards Technical News Bulletin, vol. 37, August 1953, No. 8, pages 113–115.